United States Patent Office 3,353,588
Patented Nov. 21, 1967

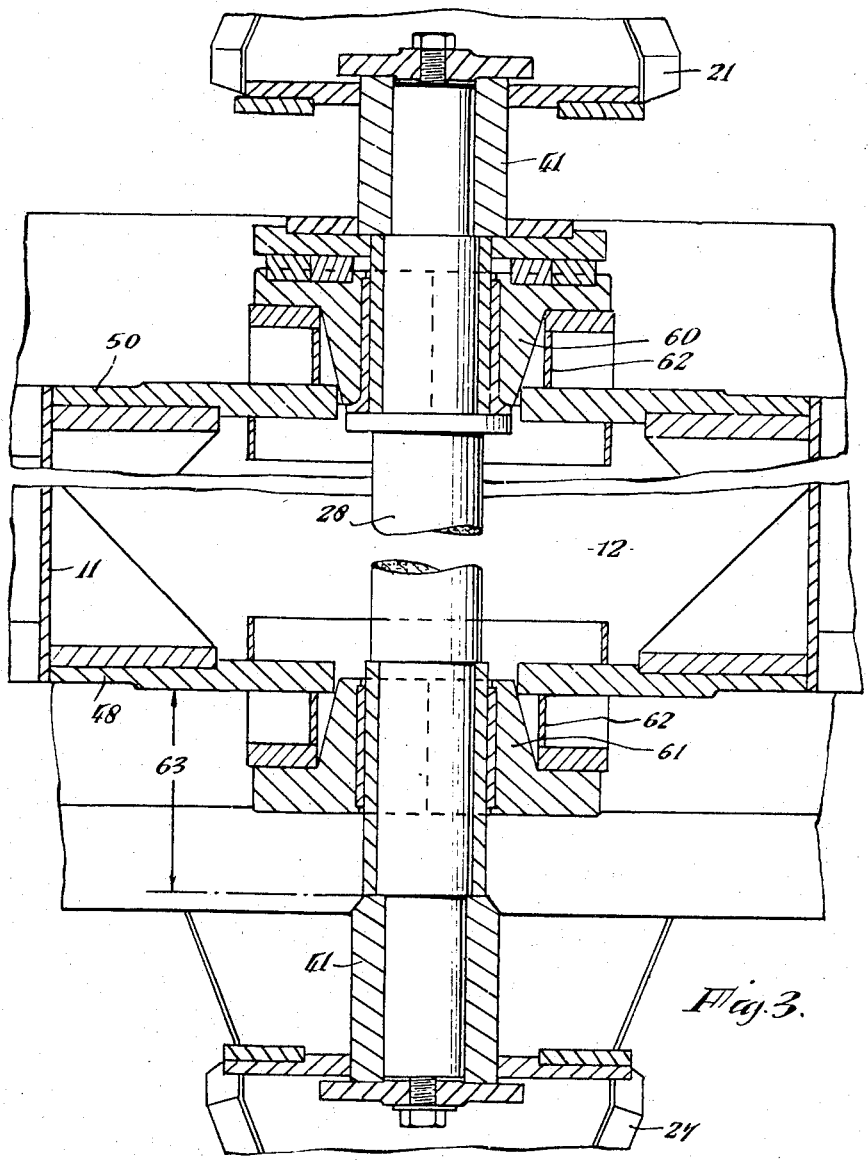
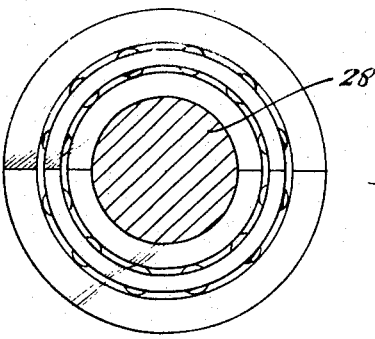
Fig. 3.
Fig. 4.

3,353,588
ROTARY REGENERATIVE HEAT EXCHANGERS
Herbert Brandt, 5961 Rothemuhle uber Olpe, and Herbert Sandmann, Hubertusweg, 5960 Olpe, both of Westphalia, Germany
Filed July 27, 1965, Ser. No. 475,124
Claims priority, application Germany, July 30, 1964, A 46,731
5 Claims. (Cl. 165—4)

ABSTRACT OF THE DISCLOSURE

To facilitate operation and maintenance of rotary regenerative heat exchangers, a relatively short central shaft is disposed within a centrally located chamber and guide and thrust bearings for the shaft are located within or close to the central chamber in order to shield them from the heat of the hot gases passing through the regenerator. To facilitate removal of the bearings for replacement without removing the shaft or disassembling the regenerator, the bearings are split radially into two or more parts which can be fastened and unfastened to each other and thereby separately removed.

---

This invention relates to rotary regenerative heat exchangers of the kind in which a substantially cylindrical regenerative heat exchange member, hereinafter referred to as a regenerator, is disposed stationary within an outer casing which has gas inlet and gas outlet means at its ends or otherwise suitably located whereby hot gas may be led to the regenerator and passed in an axial direction through passages in the regenerator so as to give up heat from the hot gas to a mass of plates or tubes which form the passages. Also disposed within the casing, and at each axial end of the regenerator, are rotatable duct members provided with means to lead air to one of the duct members and from the other duct member after passing in an axial direction through the regenerator, the duct members rotating co-axially in relation to the stationary regenerator and having openings which pass over the end surfaces of the regenerator during such rotation, the opening or openings in one of the two duct members being disposed in mirror-image relation to the opening or openings in the other duct member so that air may flow direct from one duct member, through part of the regenerator mass to pick up heat from said mass, and then into the other duct member. Usually the said openings in the duct members are of sector shape, and there may be one or more such openings in each duct member.

In large diameter heat exchangers of the kind referred to, the rotatable air duct members are mounted upon a shaft which extends along the axis of the regenerator, through an axially disposed chamber in the regenerator, there being guide bearings for the shaft disposed at or near the axial ends of the regenerator, while, when the axis of the regenerator is vertical or substantially vertical, a support or thrust bearing for the shaft is disposed outside of the air and gas ducts so as to be accessible for maintenance. The shaft therefore must pass through the air and gas ducts, at the thrust bearing end, and may also pass through the air and gas ducts at the shaft drive end. This results in very long shafts, which in turn requires comparatively heavy and expensive structure if deflection of the shaft is to be confined within permitted limits.

For smaller heat exchangers a simpler design has been used, in which the weight of the rotatable air duct members is supported upon rollers disposed at the periphery of the cylindrical regenerator casing, the ends of the central shaft connecting the two rotatable air duct members to each other being located at or within the said air duct members, and a drive to the said air duct members being provided by a motor-driven pinion engaging a rack around the periphery of one of the air duct members.

Such simplified design of the mounting of the air duct members is not applicable for large diameter regenerators, because under the prevailing operating temperatures of 200° C. to 400° C. the unequal heat expansion of various parts of the regenerator end surfaces creates large warping thereof. For example, a warping of an end surface of the regenerator of only 0.5 mm. is sufficient to confine the weight of the rotating parts on to only two or three of the peripheral support rollers, thus creating the danger that the sealing surfaces of the rotating parts no longer lie on many of the rollers but lie on the actual end surfaces of the regenerator. The grinding of the rotating parts on the said end surfaces imposes a necessity for a greatly increased driving power.

The object of the present invention is to improve a rotary regenerative heat exchanger of the kind referred to in such manner that large heat expansion of the regenerator end surfaces has little or no effect upon the journalling of the central shaft which supports the two rotatable air duct members.

According to this invention a rotary regenerative heat exchanger, comprising a substantially cylindrical regenerator disposed stationary within an outer casing having gas inlet and gas outlet means at its ends, a rotatable air duct member at each end of the regenerator, means to lead air to one of the said air duct members, means to lead air from the other said air duct member, the air duct members being rotatable co-axially in relation to the stationary regenerator and being provided with openings which pass over the end surfaces of the regenerator during such rotation, whereby air may flow from one air duct member, through the regenerator, and out through the other air duct member, the air, during said flow, collecting heat previously stored in said regenerator by the passage of hot gas therethrough, the two rotatable air duct members being connected together by a shaft which passes through a chamber formed axially in the regenerator, is characterised in that the shaft is mounted rotatably in and supported by bearing members all of which are supported from the structure of the regenerator.

In the accompanying drawings:

FIG. 3 is a sectional elevation of parts of a regenerator and parts of rotatable air duct members of a rotary regenerative heat exchanger incorporating another embodiment of the invention.

FIG. 4 is a diagrammatic axial elevation of a radially divided bearing used in the embodiments of the invention.

Figure 1:
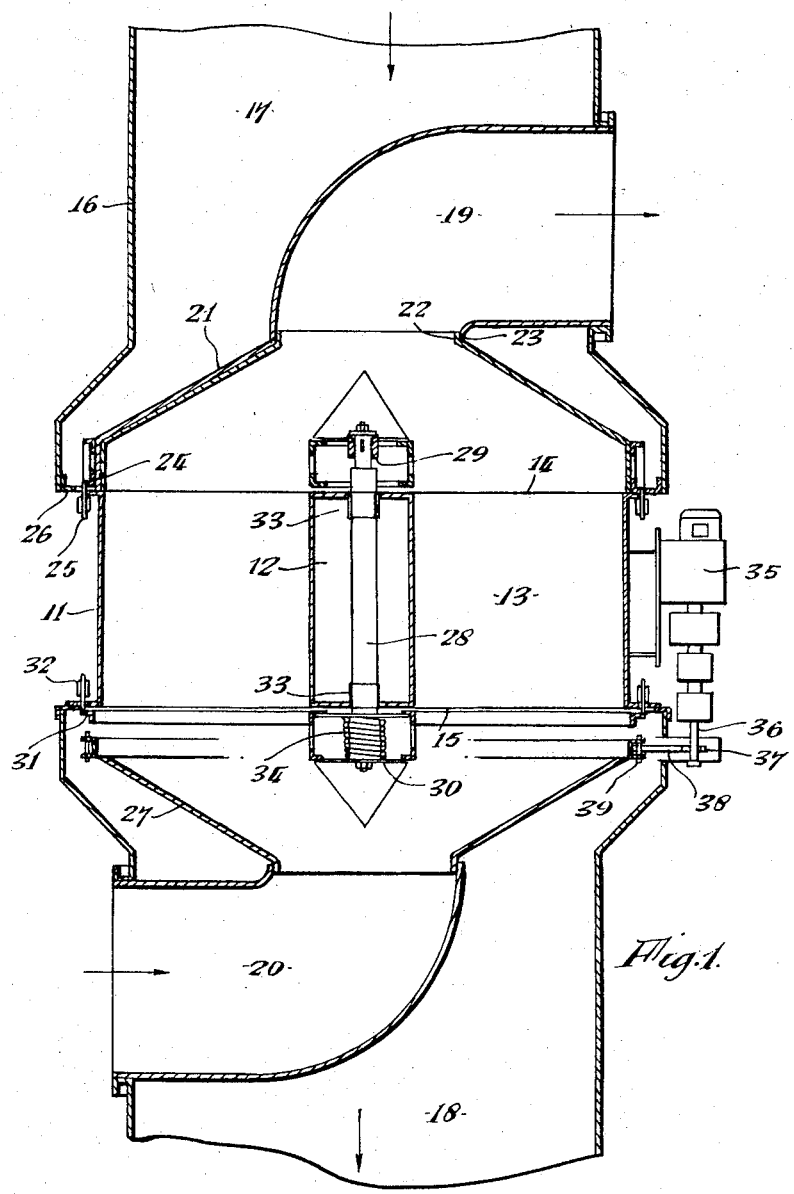
FIG. 1 is a diagrammatic sectional elevation of a known form of rotary regenerative heat exchanger.

Referring to FIG. 1, the casing of a stationary regenerator is shown at 11, having a central or axial chamber 12, the central chamber 12 being surrounded by an annular chamber 13 which contains a mass of heat storage plates (not shown). The mass of heat storage plates extends from one axial end 14 of the regenerator to the other axial end 15, and usually the chamber 13 is divided into a large number of sub-chambers into each of which a pack of plates is disposed.

The casing 16 of the heat exchanger extends from both ends of the regenerator casing 11 so as to provide a gas inlet chamber 17 at one end and a gas outlet chamber 18 at the other end.

Within the gas chambers 17 and 18 there are, respectively, a stationary air outlet duct 19 and a stationary air inlet duct 20.

A rotatable air outlet duct member 21 has a central neck 22 which is mounted rotatably in gas-tight manner in the inner end 23 of the stationary air outlet duct 19, and has its peripheral flanges 24 supported on rollers 25 which are located at intervals around the peripheral flange 26 of the regenerator casing 11. The air outlet duct member 21 usually is formed as two diametrically opposed sectors, which are located in mirror-image relation to the similar sectors of the air inlet duct member 27.

The rotatable air inlet duct member 27 is similarly mounted on the air inlet duct 20.

The two rotatable air duct members 21 and 27 are interconnected by a shaft 28 which passes vertically and axially through the central chamber 12 of the regenerator, and is connected thereto at 29 and 30. The lower air duct member 27 is suspended from the upper air duct member 21 by the shaft 28, and thus its peripheral flanges 31 are retained in rolling contact with the rollers 32.

The shaft 28 rotates in guide bearings 33 in the ends of the regenerator casing 11.

The upper end support 29 on the shaft 28 for the air duct member 21 comprises a hub having a longitudinally convex inner face to allow the air duct member 21 to rock thereon, so that the air duct member can change its position to remain substantially parallel to the end face 14 of the regenerator in the event of distortion taking place due to heat expansion.

The lower end support 30 on the shaft 28 for the air duct member 27 includes a spring 34 which provides resilience to the air duct member.

Rotation of the air duct members 21 and 27 is effected by a motor 35, mounted on the outside of the regenerator casing 11, a spindle 36, sprockets 37, 38, and a rack 39 disposed around the periphery of the air duct member 27.

Figure 2:
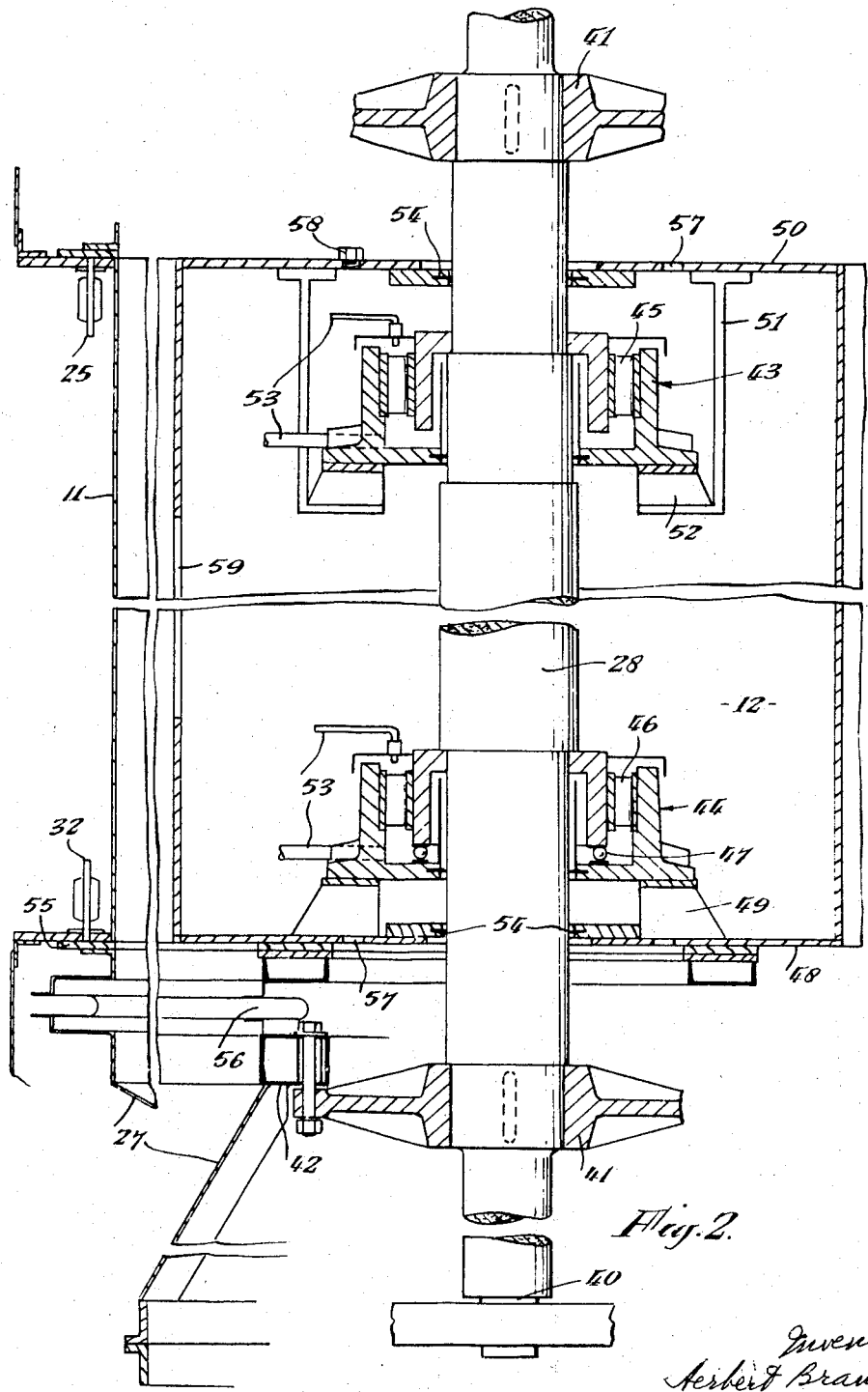
FIG. 2 is a sectional elevation of parts of a regenerator and parts of rotatable air duct members of a rotary regenerative heat exchanger incorporating one embodiment of the invention.

The improved mounting of the rotatable air duct members, according to one embodiment of the present invention, is shown in FIG. 2. The shaft 28, disposed within the central chamber 12 of the regenerator casing 11, is connected at its ends to the rotatable air duct members, as shown at 40 with respect to the bottom end of the shaft and the air inlet duct member 27. The shaft 28 is also provided with hubs 41, located outside of the regenerator casing 11, by which the air duct members are also attached to the shaft, as shown at 42 with respect to the air duct member 27.

The bearings for the rotatable shaft 28 comprise an upper guide bearing 43, and a lower combined guide and thrust bearing 44, both of the bearings being located within the central chamber 12 of the regenerator casing 11.

The upper bearing 43 comprises guide bearing rollers 45, while the lower bearing 44 comprises guide bearing rollers 46 and thrust bearing balls 47.

The bottom bearing 44 is supported on the bottom end plate 48 of the regenerator casing 11 by support pillars 49, while the upper bearing 43 is suspended from the upper end plate 50 of the regenerator casing by suspension elements 51 and support pillars 52.

The bearings 43 and 44 are of the kind which are divided across their diameter, as shown diagrammatically in FIG. 4, so as to be removable from the shaft 28, and they may be provided with oil-cooling means, the cooling oil being circulated by means of pipes 53.

The passages in the end plates 48 and 50 through which the shaft 28 extends are sealed against the entry of gas or air to the chamber 12 by copper seals 54. A small controlled quantity of air can be admitted to the chamber 12 through openings 57 in the regenerator casing end plates 48 and 50, the said openings being controlled by screw studs 58.

Each rotatable air duct member is provided, as shown with respect to the air inlet duct member 27, with sealing elements 55, carried by elastic frames 56, which roll on the rollers 25 and 32.

The weight of the rotatable air duct members is carried by the combining guide and thrust bearing 44 supported on the regenerator casing 11.

Maintenance of the bearings 43 and 44, including removal and replacement if required, can be effected by an operator entering the chamber 12 through an opening 59 in the wall of the chamber, access to said opening being provided by a manhole in an axial end of the regenerator annular chamber 13 and a passage in the annular chamber, which passage, for this purpose, is devoid of heat-transfer plates.

The locating of the bearings for the shaft 28 within the regenerator axial chamber 12 also results in a decrease in the relative heat expansion between the stationary regenerator and the rotatable air duct members.

In the modified embodiment of the invention shown in FIG. 3, the upper and lower bearings 60 and 61, respectively, which in this case are friction bearings, are disposed outside of the central chamber 12 of the regenerator casing 11 but are both mounted on the end plates 50 and 48 of the chamber 12 by means of brackets 62 whereby the bearings are supported by the structure of the regenerator. The hub 41 for the lower air duct member 27 is disposed at a distance 63 below the bottom end plate 48 of the regenerator casing 11 which is greater than the axial length of the lower bearing 61 so that sufficient free space is provided to enable the bearing to be removed from the shaft 28 for maintenance by being moved towards the hub after being disconnected from the casing end plate 48.

The invention can, of course, be applied to a rotary regenerative heat exchanger wherein the axis thereof is horizontal or is inclined, in addition to being applied to heat exchangers having a vertical axis as shown in the accompanying drawings.

A radially divided bearing is shown diagrammatically in FIG. 4, divided into two half-bearings which are secured to each other in any known manner.

What we claim and desire to secure by Letters Patent is:

1. A rotary regenerative heat exchanger which comprises an outer casing, a substantially cylindrical stationary regenerator disposed within the casing and having a central chamber therethrough, said casing having gas inlet and gas outlet means at opposite ends, a shaft passing axially through the chamber, means for supporting said shaft, two rotatable air duct members one disposed on each end of said shaft, said duct members being rotatable co-axially in relation to the stationary regenerator and each one having openings which pass over the end surfaces of the regenerator during rotation, means for leading air to one duct member, means for leading air from the other duct member, guide bearings disposed at one end of the shaft, combined guide and thrust bearings disposed at the other end of the shaft, means for supporting said bearings from the regenerator casing, said bearings being radially divided into at least two portions supporting and guiding said shaft disposed within said central chamber, said bearings being removable in whole or in part independently of said shaft, and access means into said chamber.

2. A rotary regenerative heat exchanger according to claim 1 further comprising closure plates disposed at each axial end of the chamber, said plates having openings through which the shaft extends and sealing means for sealing the openings to prevent the passage of gas or air therethrough.

3. A rotary regenerative heat exchanger according to claim 1 which further comprises means for supplying and circulating oil to and through said bearings to effect cooling.

4. A regenerative heat exchanger according to claim 1 wherein said guide bearing comprises guide bearing rollers and said combined guide and thrust bearings comprise guide bearing rollers and thrust bearing balls, whereby the combined guide and thrust bearings carry the weight of the rotatable air duct members.

5. A rotary regenerative heat exchanger which comprises an outer casing, a substantially cylindrical stationary regenerator disposed within the casing and having a central chamber therethrough, said casing having gas inlet and gas outlet means at opposite ends, a shaft passing axially through the chamber, means for supporting said shaft, two rotatable air duct members one disposed on each end of said shaft, said duct members being rotatable co-axially in relation to the stationary regenerator and each one having openings which pass over the end surfaces of the regenerator during rotation, means for leading air to one duct member, means for leading air from the other duct member, guide bearings disposed at one end of the shaft, combined guide and thrust bearings disposed at the other end of the shaft, means for supporting said bearings, said bearings being radially divided into at least two portions supporting and guiding said shaft disposed within said central chamber, said bearings being removable in whole or in part independently of said shaft, access means into said chamber, wherein at least one of the bearings is disposed outside of the axial chamber of the regenerator at an end of the regenerator, the air duct member at the end of the regenerator having a hub member mounted on the shaft, the bearing being disposed between the end of the regenerator and the hub member, and the axial spacing of the hub member from the end of the regenerator being greater than the axial length of the bearing.

References Cited
UNITED STATES PATENTS

| | | | |
|---|---|---|---|
| 2,701,171 | 1/1955 | Henter | 308—160 |
| 3,181,602 | 6/1961 | Johnstone | 165—4 |

ROBERT A. O'LEARY, *Primary Examiner.*

T. W. STREULE, *Assistant Examiner.*